Oct. 17, 1950     C. J. SATERLIE ET AL     2,525,952
BUILT-IN AUTOMOBILE REFRESHMENT BAR

Filed Feb. 27, 1948     2 Sheets—Sheet 1

INVENTOR.
Clifford J. Saterlie
George G. Perkins
BY
McMorrow, Berman & Davidson
ATTORNEYS Oct. 17, 1950     C. J. SATERLIE ET AL     2,525,952
BUILT-IN AUTOMOBILE REFRESHMENT BAR
Filed Feb. 27, 1948     2 Sheets-Sheet 2
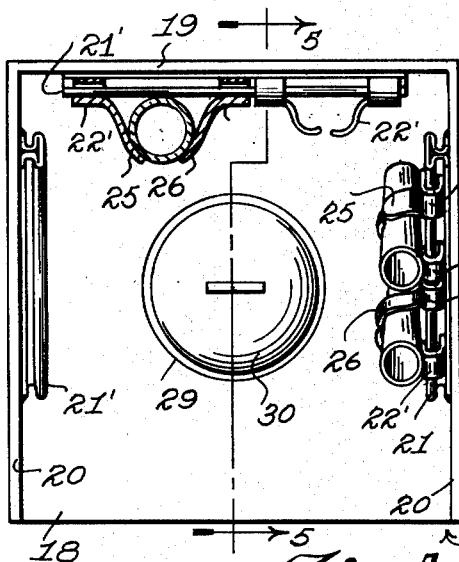
Fig. 4.
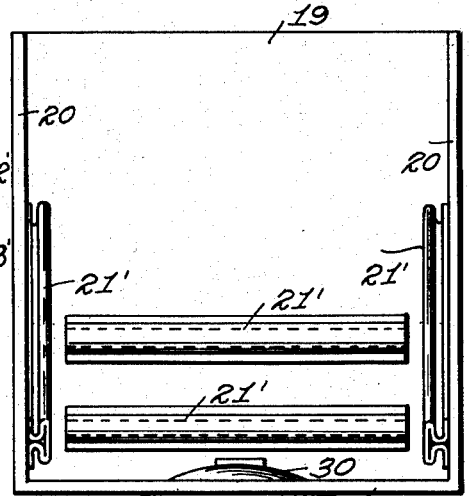
Fig. 6.
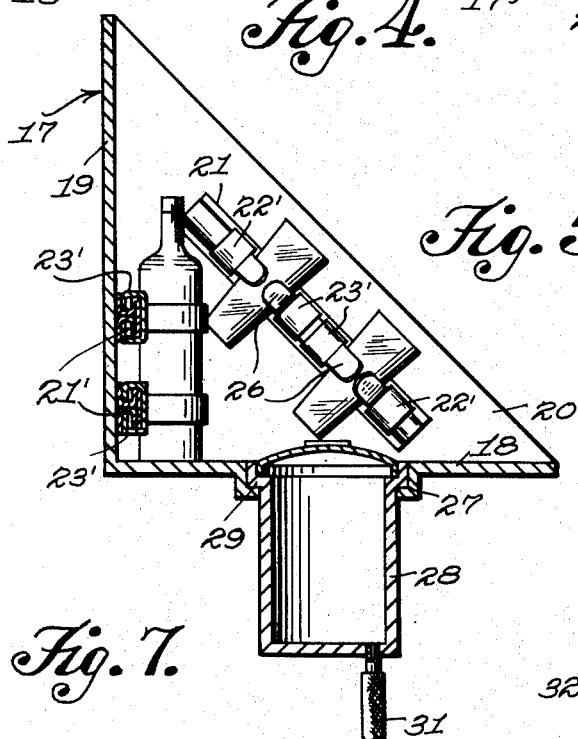
Fig. 5.
Fig. 7.
Fig. 8.
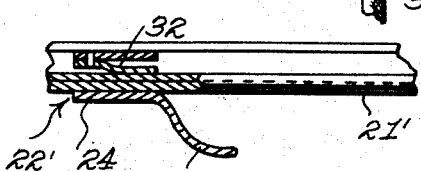
INVENTOR.
Clifford J. Saterlie
George G. Perkins
BY
McMorrow, Berman & Davidson
ATTORNEYS Patented Oct. 17, 1950

2,525,952

UNITED STATES PATENT OFFICE 2,525,952

BUILT-IN AUTOMOBILE REFRESHMENT BAR

Clifford J. Saterlie, Bakersfield, and George G. Perkins, Buttonwillow, Calif.

Application February 27, 1948, Serial No. 11,466

2 Claims. (Cl. 312—172)

This invention relates to automobile interiors, and more particularly to automobile seat back construction.

A main object of the invention is to provide a novel and improved built-in automobile refreshment bar for storing lunches, cold drinks, picnic food, and the like, which is very simple in construction, compact in size, and readily accessible for placing articles therein or for removing the articles when desired.

A further object of the invention is to provide an improved refreshment bar and food storage compartment for automobiles which is normally closed off and concealed by a portion of an upholstered seat back of the automobile but which may be readily opened by swinging said seat back portion forwardly, the seat back portion then serving as a table on which articles of food and the like from the compartment may be placed.

Further objects and advantages of the invention will become apparent from the following description and claims, and from the accompanying drawings, wherein:

Figure 4 is an enlarged top plan view partly in cross-section, of the refreshment bar receptacle element employed in the structure of Figure 1.

Figure 5 is a cross-sectional view taken on line 5—5 of Figure 4.

Figure 6 is a front elevational view of the receptacle element of Figure 4 with the article retaining clips thereof removed.

Figure 7 is an enlarged fragmentary detail view, partly in cross-section of a clip element and its supporting track, as employed in the receptacle of Figure 4.

Figure 8 is an enlarged perspective view of a clip element employed in the receptacle of Figure 4.

Figure 1:
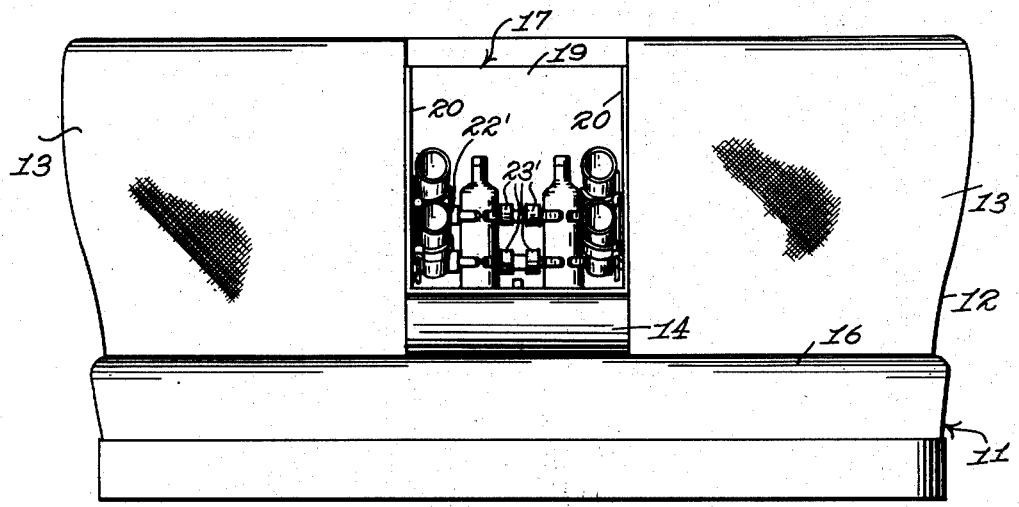
Figure 1 is a front elevational view of an automobile seat constructed in accordance with the present invention and arranged in conjunction with a built in refreshment bar according to this invention, the bar being shown in open position.
Figure 2:
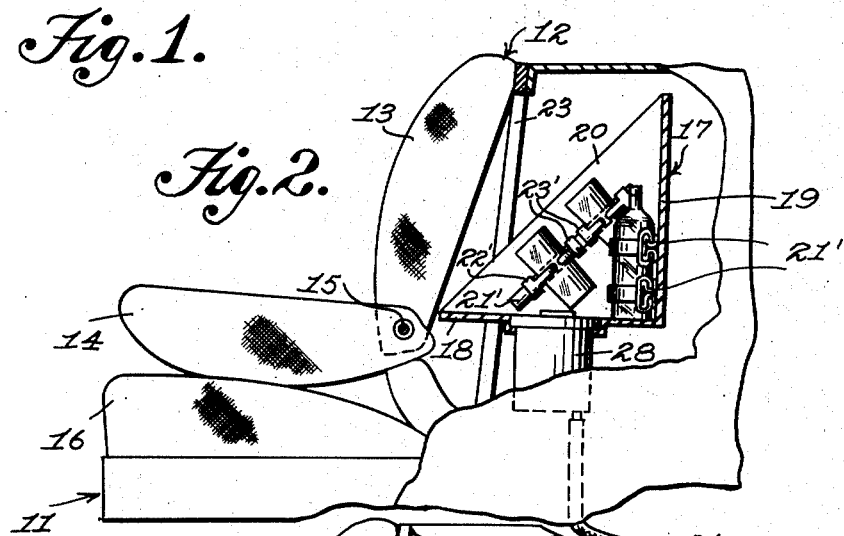
Figure 2 is a side elevational view, partly in vertical cross-section of the refreshment bar and seat structure of Figure 1.
Figure 3:
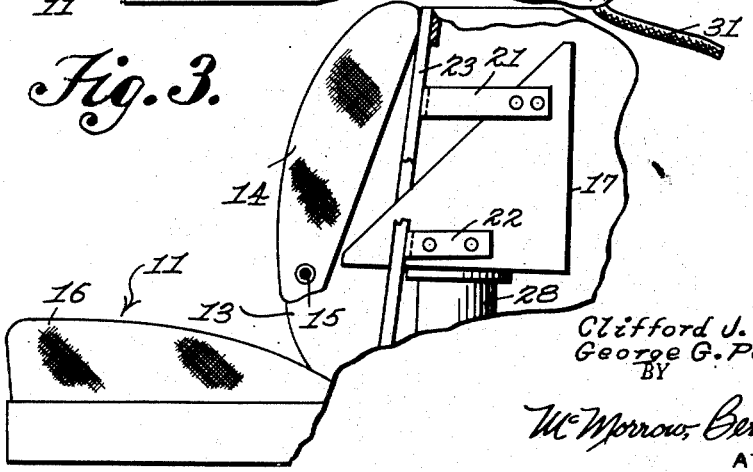
Figure 3 is a side elevational view, partly broken away, of the bar and seat structure of Figure 1, with the bar closed off by the movable seat back portion of the structure.

Referring to the drawings, 11 designates an automobile seat, such as a rear seat, and 12 designates the upholstered back of the seat. The seat back is divided into stationary sections 13, 13 and a movable intermediate section 14 which is hinged at its lower end to the framework of the seat back between stationary sections 13, 13 by a hinge rod 15, as shown in Figures 2 and 3, so that said intermediate section 14 may be swung from a normal closed position flush with stationary sections 13, 13, shown in Figure 3, to a horizontal open position, shown in Figure 2, wherein the section 14 rests on the seat cushion, shown at 16.

Designated at 17 is a receptacle member rigidly secured in the space behind the seat back 12. Said receptacle member comprises a bottom wall 18, a rear wall 19 and triangular side walls 20, 20 connecting the rear wall to the bottom wall. The side walls 20, 20 are connected by brackets, such as shown at 21, 22 to upstanding frame members 23 secured to the automobile body structure behind the seat back at each side of the movable section 14. As shown in Figure 2, the receptacle member 17 is supported so that bottom wall 18 is substantially flush with the upper surface of the movable section 14 when said movable section is in its horizontal open position.

Secured to the side walls 20, 20 of the receptacle member are guide tracks 21' which are substantially I-shaped in cross-section, and slidably interlocked with the guide tracks are clip members shown at 22', 23'. The clip members 22' comprise sleeve portions 24 adapted to slidably fit the top flanged portion of the guide tracks 21' and having spring fingers 32 engaging beneath said flanged portion with sufficient friction to prevent dislodgement thereof unless the clip members are moved manually. Said clip members 22' are formed with arcuate arms 25. The intermediate clip members 23' also have similar spring fingers providing frictional engagement with the flanges of the tracks 21' and are formed with arcuate arms 26 opposing the arms 25 of the clip members 22'. As shown in Figures 4 and 5 drinking glasses and the like may be held between the opposed arcuate arms 25 and 26 of respective pairs of clip members 22' and 23'.

Secured to the rear wall 19 are additional guide tracks 21' arranged horizontally, and mounted thereon are additional pairs of clip members 22' and 23' arranged to secure beverage bottles and the like in vertical position at the rear of the receptacle 17.

The bottom wall 18 is formed at its central portion with a depressed annular seat 27 in which is removably positioned an ice container 28, said container having an annular outwardly offset top rim 29 which is received in seat 27, as shown in Figure 5. The container is normally closed by a removable top cover 30 which is received inside the annular top rim 29. Connected to the bottom of the container 28 is a flexible drain hose 31 through which water may be conveyed to the ground beneath the vehicle.

Although intended primarily for storage of food and beverages, the receptacle 17 may also be employed to store other articles. Access to the receptacle may be readily obtained by swinging movable section 14 to the position of Figure 2. In this position, the movable section 14 may be employed as a table upon which articles of food and beverage containers may be placed.

While a specific embodiment of a built-in refreshment bar for automobiles has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. A food storage device for mounting on a vehicle, comprising a receptacle having a bottom, a plurality of closed sides, and at least one open side, said bottom having a depressed annular opening, an ice container removably mounted within said annular opening, and means embodying at least one pair of clips arranged in opposed spaced relation disposed adjacent each of said side walls and each pair mounted on the adjacent side wall for slidable movement relative to each other for frictionally embracing a plurality of individual food containers, whereby said food containers may be slidably and frictionally positioned on said side walls.

2. A food storage device for mounting on a vehicle, comprising a receptacle having a bottom, a plurality of closed sides, and at least one open side, said bottom having a depressed annular opening, an ice container removably mounted within said annular opening, flange track members secured to said side walls, and pairs of clip members frictionally and slidably engaged with said track members, each pair of clip members having opposed arcuately projecting arms thereon for embracing a food container.

CLIFFORD J. SATERLIE.
GEORGE G. PERKINS.

REFERENCES CITED

The following references are of record in the file of this patent:

UNITED STATES PATENTS

| Number | Name | Date |
|---|---|---|
| 578,504 | Stivers | Mar. 9, 1897 |
| 990,145 | Klopping | Apr. 18, 1911 |
| 1,235,539 | Abadie | Aug. 7, 1917 |
| 1,454,618 | Banks | May 8, 1923 |
| 2,152,505 | Stuart et al. | Mar. 28, 1939 |
| 2,190,474 | Gregory | Feb. 13, 1940 |
| 2,358,071 | Hurtado | Sept. 12, 1944 |
| 2,432,494 | Bailey | Dec. 16, 1947 |

FOREIGN PATENTS

| Number | Country | Date |
|---|---|---|
| 26,520 | Great Britain | 1907 |